United States Patent [19]

Wise et al.

[11] Patent Number: 5,058,283
[45] Date of Patent: Oct. 22, 1991

[54] CAR SEAT LEVEL INDICATOR

[75] Inventors: Robert D. Wise, Akron; Mark A. Sedlack, Cuyahoga Falls, both of Ohio

[73] Assignee: Century Products Company, Macedonia, Ohio

[21] Appl. No.: 615,565

[22] Filed: Nov. 19, 1990

[51] Int. Cl.⁵ ............................................. G01C 9/02
[52] U.S. Cl. ...................................... 33/371; 33/347; 33/333
[58] Field of Search ................. 33/347, 353, 354, 370, 33/371, 365, 379, 333, 334; 116/215; 297/DIG. 2, 250

[56] References Cited

U.S. PATENT DOCUMENTS

| | | |
|---|---|---|
| 28,088 | 5/1860 | Keeler .............................. 33/353 X |
| 685,569 | 10/1901 | Bullard ................................ 33/365 |
| 2,527,982 | 10/1957 | Brock . | 
| 3,111,563 | 1/1964 | Selbman . |
| 3,422,544 | 1/1969 | Wyse . |
| 4,100,681 | 7/1978 | Hollander . |
| 4,126,944 | 11/1978 | Burkhart . |
| 4,228,982 | 10/1980 | Sellers . |
| 4,554,994 | 11/1985 | Weiner .............................. 33/354 X |
| 4,775,183 | 10/1988 | Tsuge et al. ..................... 297/250 X |

Primary Examiner—Harry N. Haroian
Attorney, Agent, or Firm—Townsend and Townsend

[57] ABSTRACT

A positioning device for a car seat indicates when the car seat has been properly positioned in an automobile or on a shopping cart. The positioning device includes a paper backing which is encapsulated in a plastic housing. The plastic housing includes a relief projection in the shape of an arc. A ball slides within the relief projection and against the paper backing. Printed information on the paper backing indicates when the seat is in the proper orientation according to the position of the ball.

5 Claims, 2 Drawing Sheets

CAR SEAT LEVEL INDICATOR

BACKGROUND OF THE INVENTION

The present invention relates to a child's car seat and more particularly to an improvement in the positioning of such seats. The typical car seat consists of a five point restraining harness which anchors to either a tubular frame or an unitary plastic seat in which the child is enclosed. The car seat is positioned within a car or similar vehicle and secured to the seat, often by using attachment posts provided by the vehicle manufacturer.

An improperly adjusted seat may cause discomfort for the child since the seat is positioned at an odd attitude. Furthermore, an odd seat attitude may indicate that the seat is not positioned correctly in the automobile which can degrade the impact performance of the car seat.

Proper positioning of the seat within the vehicle, is accomplished primarily by merely looking at the seat. This line of sight method is subject to parallax errors and other inaccuracies due to the difficulty of locating an adequate frame of reference within most vehicles. In addition, seat angles vary from automobile to automobile further complicating visual estimation of proper car seat orientation.

SUMMARY OF THE INVENTION

The present invention provides of quick and easy to use means for determining when a car seat has been properly positioned within a vehicle. According to one embodiment of the invention a positioning device is attached in a known orientation to the side portions of the unitary seat and back structure of a child's car seat. The positioning device comprises a backing material which is encapsulated in a plastic housing. The plastic housing contains a arc-like relief projection. A ball rolls within the relief projection and against the backing material under the influence of gravity. Indicator regions on the backing material tell the parent or guardian when the seat is properly positioned according to the position of the ball.

DESCRIPTION OF THE PREFERRED EMBODIMENT

Figure 1:
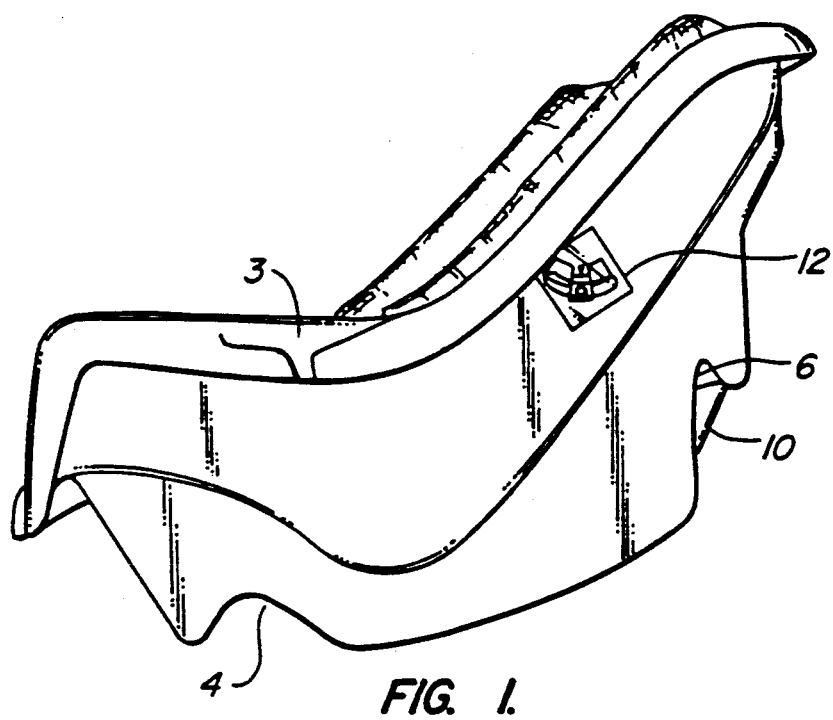
FIG. 1 is a side view of a child's car seat incorporating an embodiment of the present invention.

FIG. 1 shows a child's car seat incorporating an embodiment of the present invention. The seat 2 comprises a unity plastic cast structure which semi-encloses the child. A harness (not shown) passes through slot 3 and is used to secure the child within seat 2. The seat is designed to be rear facing and can hold a child of up to 20 pounds. Seat 2 can be positioned within an automobile and to engage car seat mounts provided by some automobile manufacturers. Alternately, seat 2 contains a first opening 4 and a second opening 6 with locking mechanism 10 on each side of the unitary housing structure. Openings 4 and 6 and locking mechanism 10 allow car seat 2 to also be secured to a shopping cart.

Attached on at least one side of said unitary structure is a leveling device 12. When seat 2 is positioned properly on the car seat, seat 2 has a known orientation relative the earth. Leveling device 12 can thus be positioned on seat 2 such that when the seat is properly positioned, level 12 is centered.

Figure 2A:
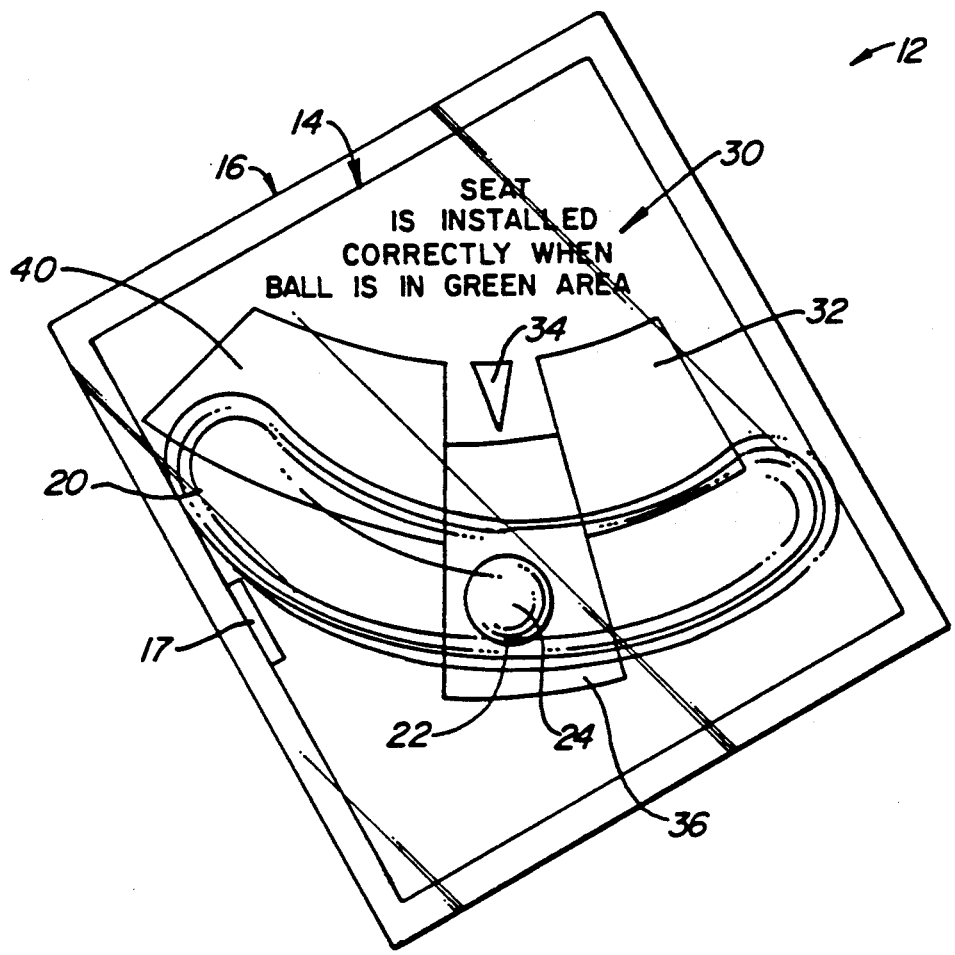
FIG. 2A is a front view of a car seat positioning device according to an embodiment of the present invention.
Figure 2B:
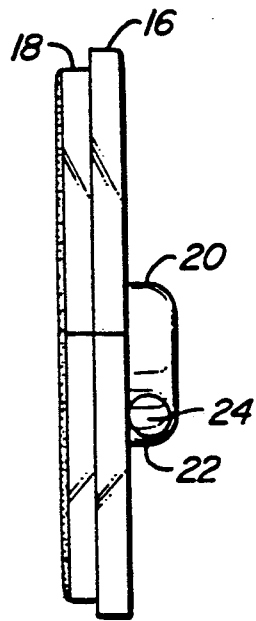
FIG. 2B is a side view of a car seat positioning device according to an embodiment of the present invention.

FIG. 2A shows an isolated view of the seat positioning level of the present invention. FIG. 2B shows a side view of the seat positioning level. Level 12 comprises a paper backing 14 encapsulated in a plastic housing 16. A printed marker 17 may be used to properly position backing 14 in housing 16. A piece of acrylic adhesive release tape 18 is located on the rear of the level housing structure 16 to secure level 12 to seat 2.

Figure 2C:
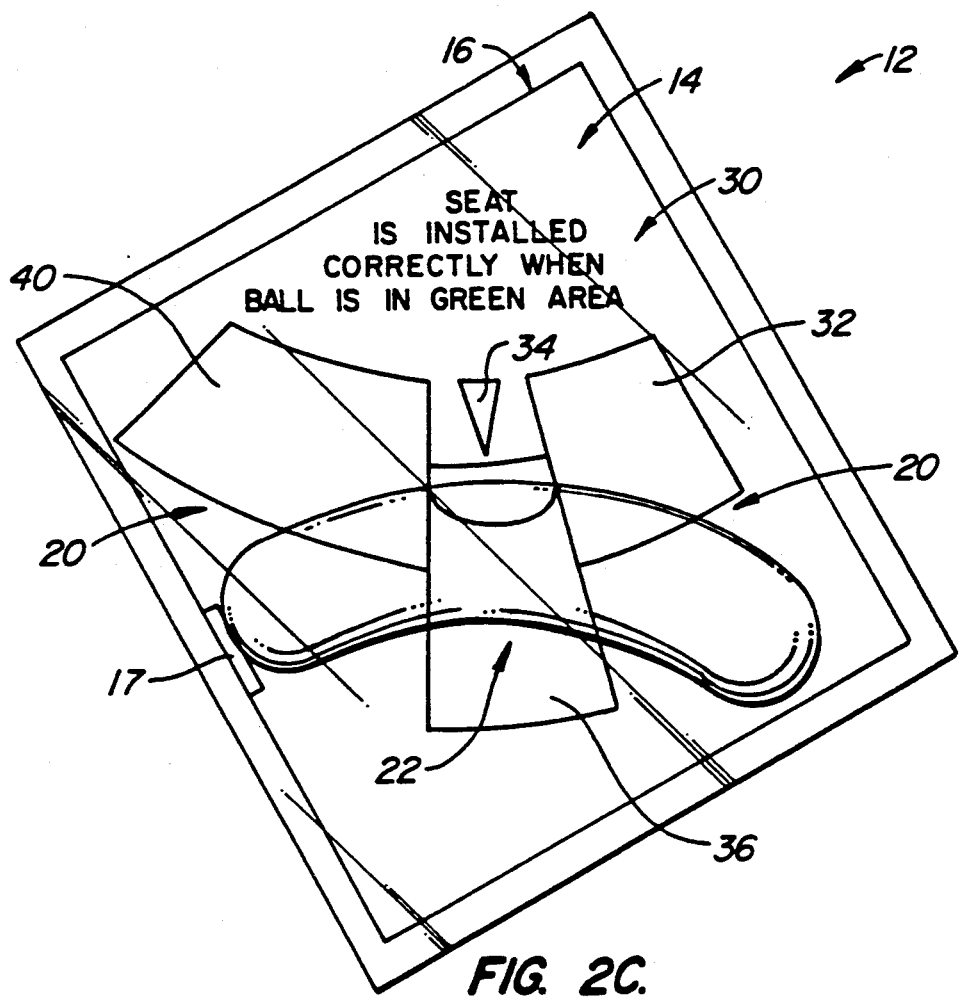
FIG. 2C is a front view of a car seat positioning device according to an alternate embodiment of the present invention.

Plastic housing 16 contains an arc-like relief projection 20. Projection 20 is formed on housing 16 such that the nadir 22 of arc 20 is the lowest point on the arc. A ball 24 is located between relief projection 20 and paper backing 14. Ball 24 may be fabricated from plastic, wood or other hard materials. Alternately, projection 20 may be filled with fluid to form a spirit level as shown in FIG. 2C.

Paper backing 14 contains printed information 30–40 which indicate proper and improper positioning of seat 2 according to the position of ball 24. Paper backing 14 comprises 60 pound coated paper in a preferred embodiment of the invention. Because the seat, when properly positioned, will have a known orientation with respect to ground, level 12 can be secured to seat 2 such that ball 24 will slide under the influence of gravity and settle in the nadir of arc-like relief projection 20 when the seat is properly positioned. This region is indicated by a green shaded area 36 and an arrow 34 printed on paper backing 14. Whenever ball 24 is located in front of area 36, seat 2 is properly positioned.

When seat 2 is improperly positioned, ball 24 will not settle in region 22, since nadir 22 is no longer the lowest point in relief projection 20 relative to earth. Instead, ball 24 will settle in one of regions 32 or 40 which are indicated in red on paper backing 14. Whenever ball 24 settles within relief projection 20 in front of regions 32 or 40, seat 2 is not properly positioned. The parent or guardian is thus signalled to reorient the seat to the proper position.

A preferred embodiment of the present invention has now been described. Variations and modifications will be readily apparent to those of skill in the art. For this reason, the invention should be construed in light of the claims.

What is claimed is:

1. A positioning device for a child's car seat comprising:
   a backing material;
   a housing which encapsulates said backing material;
   an arc-like relief projection contained on said housing;
   a ball, contained within said arc-like relief projection and disposed between said housing and said backing material, which is free to move under the influence of gravity;
   means, located on a rear portion of said housing, for adhering said positioning device to said car seat in a fixed position relative to said car seat; and means, located on said backing material, for indicating, according to a position of said ball, when said car seat is properly positioned.

2. A positioning device for a child's car seat comprising:
   a backing material;
   a housing which encapsulates said backing material;
   an arc-like relief projection contained on said housing;
   a ball, contained within said arc-like relief projection and disposed between said housing and said backing material, which is free to move under the influence of gravity;
   means, located on a rear portion of said housing, for adhering said positioning device to said car seat in a fixed position relative to said car seat;
   means, located on said backing material, for indicating, according to a position of said ball, when said car seat is properly positioned;
   a first region on said backing material to indicate a proper seat position when said ball is positioned in front of said region; and
   and a second and third region on said backing material each located adjacent said first region to indicate an improper seat position when said ball is positioned in front of one of said second and third regions.

3. A child's car seat comprising:
   a unitary seat and housing structure having two sides portions;
   a position monitor affixed to at least one of said side portions for indicating when said car seat is properly positioned; and wherein said position monitor includes:
   (i) a backing material;
   (ii) a housing which encapsulates said backing material;
   (iii) an arc-like relief projection contained on said housing;
   (iv) a ball, contained within said arc-like relief projection and disposed between said housing and said backing material, which is free to move under the influence of gravity;
   (v) means, located on a rear portion of said housing, for adhering said position monitor to said unitary housing side portion in a fixed position relative to said car seat; and
   (vi) means, located on said backing material, for indicating, according to a position of said ball, when said car seat is properly positioned.

4. The child'car seat of claim 3 wherein said means for indicating further comprises:
   a first region on said backing material to indicate a proper seat position when said ball is positioned in front of said first region; and
   a second and third region on said backing material each located adjacent said first region to indicate an improper seat position when said ball is positioned in front of one of said second and third regions.

5. A child's car seat comprising:
   a unitary seat and housing structure having two side portions;
   a position monitor, having a spirit level, and affixed to at least one of said side portions for indicating when said car seat is properly positioned;
   a backing material located behind said spirit level;
   a first region of a first color on said backing material to indicate a proper seat position when a bubble within said spirit level is positioned in front of said first region; and
   a second and third region having a color different than said first color, and located on said backing material adjacent said first region, to indicate an improper seat position when said bubble is positioned in front of one of said second and third regions.

* * * * *